(12) United States Patent
Ibrahim et al.

(10) Patent No.: US 10,822,087 B2
(45) Date of Patent: Nov. 3, 2020

(54) CARPET DISPLAY SYSTEMS AND METHODS

(71) Applicant: THE BOEING COMPANY, Chicago, IL (US)

(72) Inventors: Yakentim Ibrahim, Brier, WA (US); Karen L. Hills, Everett, WA (US); Richard Babunovic, Mill Creek, WA (US)

(73) Assignee: THE BOEING COMPANY, Chicago, IL (US)

( * ) Notice: Subject to any disclaimer, the term of this patent is extended or adjusted under 35 U.S.C. 154(b) by 381 days.

(21) Appl. No.: 15/468,166

(22) Filed: Mar. 24, 2017

(65) Prior Publication Data
US 2018/0273178 A1 Sep. 27, 2018

(51) Int. Cl.
*B64D 11/00* (2006.01)
*G09F 13/00* (2006.01)
(Continued)

(52) U.S. Cl.
CPC ............... *B64D 11/00* (2013.01); *B60Q 3/43* (2017.02); *B60Q 3/46* (2017.02); *B60Q 3/47* (2017.02); *B60Q 3/745* (2017.02); *B64D 25/00* (2013.01); *B64D 45/00* (2013.01); *B64D 47/02* (2013.01); *G09F 13/005* (2013.01); *G09F 13/08* (2013.01); *G09F 21/06* (2013.01); *B64D 2011/0038* (2013.01); *B64D 2045/007* (2013.01); *B64D 2203/00* (2013.01); *G09F 2013/044* (2013.01); *G09F 2013/0418* (2013.01); *G09F 2013/222* (2013.01)

(58) Field of Classification Search
CPC ........ B64D 11/00; B64D 25/00; B64D 47/02; B64D 45/00; B64D 2011/0038; B64D 2203/00; B64D 2045/007; B60Q 3/43; B60Q 3/46; B60Q 3/47; B60Q 3/745; G09F 13/005; G09F 13/08; G09F 21/06; G09F 2013/044; G09F 2013/0418; G09F 2013/222
See application file for complete search history.

(56) References Cited

U.S. PATENT DOCUMENTS 8,894,233 B2    11/2014 VanHerpen
9,845,935 B1 *  12/2017 Cheng ..................... G11C 5/02
(Continued)

FOREIGN PATENT DOCUMENTS

EP       3034402       6/2016

OTHER PUBLICATIONS

"Luminous Carpets." http://www.lighting.philips.co.uk/systems/packaged-offerings/office-and-industry/luminous-carpets.html, accessed Mar. 13, 2017.
(Continued)

*Primary Examiner* — Assres H Woldemaryam
(74) *Attorney, Agent, or Firm* — The Small Patent Law Group LLC; Joseph M. Butscher

(57) ABSTRACT

A carpet display system includes a plurality of carpet modules. Each of the plurality of carpet modules includes a translucent support panel, a carpet layer secured to the support panel, and a light-emitting element coupled to the support panel. The light-emitting element is configured to emit light through the support panel to provide lighting effects through the carpet layer.

20 Claims, 7 Drawing Sheets

(51) Int. Cl.
    *G09F 13/08*     (2006.01)
    *G09F 21/06*     (2006.01)
    *B64D 45/00*     (2006.01)
    *B60Q 3/46*     (2017.01)
    *B60Q 3/47*     (2017.01)
    *B64D 25/00*     (2006.01)
    *B60Q 3/43*     (2017.01)
    *B60Q 3/74*     (2017.01)
    *B64D 47/02*     (2006.01)
    *G09F 13/04*     (2006.01)
    *G09F 13/22*     (2006.01)

(56) References Cited

U.S. PATENT DOCUMENTS

| | | | | |
|---|---|---|---|---|
| 2004/0217876 | A1* | 11/2004 | Blum | A47L 23/22 340/815.4 |
| 2009/0021955 | A1* | 1/2009 | Kuang | H05B 33/0803 362/479 |
| 2010/0020038 | A1* | 1/2010 | Vogel | G06F 3/041 345/173 |
| 2010/0265731 | A1* | 10/2010 | Van Herpen | B60Q 1/52 362/543 |
| 2011/0286213 | A1 | 11/2011 | VanHerpen | |
| 2017/0043711 | A1* | 2/2017 | Goeloe | B60R 11/04 |

OTHER PUBLICATIONS

Communication regarding EP 18163701.8-101, dated Oct. 22, 2019.

\* cited by examiner ental control is fixed. If an operator prefers a different# CARPET DISPLAY SYSTEMS AND METHODS

FIELD OF EMBODIMENTS OF THE DISCLOSURE

Embodiments of the present disclosure generally relate to interior spaces, for example, cabins within vehicles, such as commercial aircraft, and, more particularly, to carpet display systems and methods, such as for interior cabins of vehicles.

BACKGROUND OF THE DISCLOSURE

Commercial aircraft typically include an interior cabin that may be divided into numerous sections. A cockpit is generally separated from a passenger cabin, which may include a first class section, a business class section, and an economy section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

Various commercial aircraft include carpet throughout an interior cabin. The carpet may be customized with respect to appearance and aesthetics. For example, an aircraft operator may prefer a particular color of carpet for each aircraft within a fleet. As another example, the carpet may include portions that show text, designs, illustrations, or the like, such as a particular pattern, company name, trade name, trademark, or the like. Images may also be projected onto the carpet; although the images would be disrupted if there is an obstruction between the projector and the carpet. As can be appreciated, once a particular carpet scheme is determined and installed within a commercial aircraft, the resulting carpet appearance is fixed. If an operator prefers a different carpet aesthetic, the carpet within the aircraft has to be replaced.

Light-transmissive carpet tiles have been developed for certain applications, such as within commercial and residential buildings. A typical light-transmissive carpet tile includes an array of light-emitting diodes (LEDs) secured to a backing that supports carpet fibers. The backing is translucent and allows light emitted by the LEDs to pass through, thereby providing lighting effects on the carpet fibers.

However, known light-transmissive carpet tiles are unable to be used with respect to commercial aircraft. In particular, each light-transmissive carpet tile includes a large, heavy, and bulky control system. Attempting to utilize such carpet tiles within the limited confines of an airplane cabin would add substantial weight to the aircraft (which, in turn, would cause the aircraft to consume increased amounts of fuel). Further, the large control systems for each carpet tile would occupy space within the cabin or electronics bay, which are otherwise to be used for different purposes such as passenger seating, overhead stowage, and the like. Also, carpeting interior portions of an aircraft with numerous light-transmissive carpet tiles would utilize large amounts of wiring that would be routed through the aircraft, thereby adding weight and design complexity to the aircraft and taking up space therein.

SUMMARY OF THE DISCLOSURE

A need exists for selectively adapting a carpet aesthetic within an aircraft, for example. A need exists for an efficient and effective way of incorporating light-transmissive carpet within an interior cabin of a vehicle, such as an aircraft.

With those needs in mind, certain embodiments of the present disclosure provide a carpet display system that includes a plurality of carpet modules, such as within an interior cabin of a vehicle. Each of the plurality of carpet modules includes a translucent support panel, a carpet layer secured to the support panel, and a light-emitting element coupled to the support panel. The light-emitting element is configured to emit light through the support panel to provide lighting effects through the carpet layer. Each of the carpet modules may also include an associated controller that is configured to control operation of the light-emitting element.

In at least one embodiment, the carpet modules include a master system carpet module having an associated master system controller within a first zone of the interior cabin, and at least one column-controlling carpet module having an associated column controller within the first zone. The column controller is communicatively coupled to the master system controller. At least one slave carpet module having an associated slave controller may be within the first zone. The slave controller is communicatively coupled to the column controller. The master system controller distributes operational control of the carpet display system among the master system controller, the column controller, and the slave controller.

In at least one embodiment, the carpet modules further include at least one other slave carpet module having an associated other slave controller within the first zone. The associated other slave controller is communicatively coupled to the master system controller. The master system controller further distributes operational control of the carpet display system to the associated other slave controller.

In at least one embodiment, the carpet modules further include a zone-controlling carpet module having an associated zone controller within a second zone of the interior cabin that differs from the first zone. The zone controller is communicatively coupled to the master system controller. The master system controller further distributes operational control of the carpet display system to the zone controller. The zone controller may be communicatively coupled to another column controller associated with at least one other column-controlling carpet module within the second zone. The other column controller may be communicatively coupled to another slave controller associated with at least one other slave carpet module within the second zone.

The carpet modules may be secured to one or more of a floor, wall, ceiling, or monument within the interior cabin.

The light-emitting element may include one or more light emitting diodes (LEDs), one or more organic light emitting diodes (OLEDs), or the like.

At least one of the carpet modules may also include one or more displays.

In at least one embodiment, the support panel includes at least one channel formed through a surface. The light-emitting element may be secured to the support panel within the channel(s). The light-emitting element may be configured to emit light through the at least one channel. In at least one embodiment, the light-emitting element is embedded within the support panel.

The vehicle may also include at least one electrical distribution system within the interior cabin. The light-emitting element may receive one or both of power and data signals through the electrical distribution system(s).

Certain embodiments of the present disclosure provide a method of providing lighting effects through a carpet display system within an interior cabin of a vehicle. The method includes providing a plurality of carpet modules within the interior cabin, and emitting light energy from light-emitting elements of the plurality of carpet modules through support panels to provide lighting effects through carpet layers.

DETAILED DESCRIPTION OF THE DISCLOSURE

Figure 1:
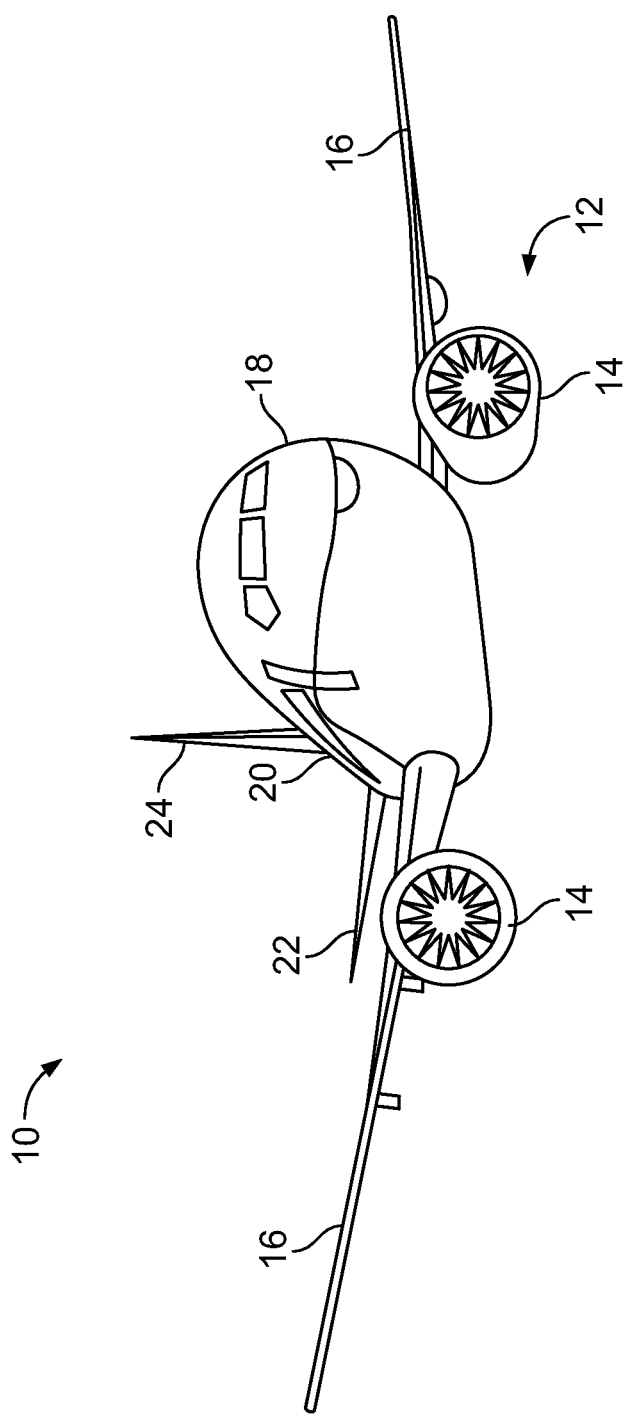
FIG. 1 illustrates a front perspective view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a scalable distributed carpet display system for use within a vehicle, such as a commercial aircraft. The carpet display system includes a plurality of light-emissive carpet modules that may be secured to a floor, wall, ceiling, or the like within an interior cabin of the vehicle. The carpet modules are configured to provide lighting effects on carpet layers. The lighting effects may include illumination through visible light (the color of which may be varied, as desired), and content, such as graphics, text, video, or the like. The lighting effects may be customized, adapted, changed, or the like.

In at least one embodiment, the carpet display system includes carpet modules that include support panels that support at least one light-emitting element, such as a plurality of light emitting diodes (LEDs). Optionally, the light-emitting element(s) may include one or more organic light-emitting diodes (OLEDs), which are configured to provide ultra-high resolution content. The light-emitting element may be secured behind carpet fibers on a curved surface, such as with respect to monuments within an aircraft. In at least one embodiment, the carpet display system includes a distributed computing architecture that allows for substantially large display surfaces.

In at least one embodiment, the carpet display system includes a floor panel-based networked display of OLED screens for displaying content directed to vehicle passengers via a carpet layer. A microcontroller is associated with each of the floor support panels.

Certain embodiments of the present disclosure provide a display system that includes a structural panel having at least one user-facing side, a light-transmissive (for example, translucent) covering associated with the user-facing side, at least one OLED display associated with the structural panel and between the structural panel and the light-transmissive panel, and at least one microcontroller associated with each structural panel. A plurality of panels provide a floor zone such as an aisleway or an entryway within a cabin of a vehicle.

Certain embodiments of the present disclosure provide a method of displaying content that includes conveying information to and from a plurality of microcontrollers in a network array, and driving a high resolution OLED display in the array on the interior surfaces of a vehicle. The network array includes zones corresponding to a structural floor grid of panels on the vehicle. The structural floor grid includes carpeting on top of the OLED display.

Embodiments of the present disclosure provide carpet display systems and methods that allow for improved branding onboard an aircraft. Further, the carpet display systems and methods improve passenger experience on an airplane, such as through improved aesthetics, light displays, content delivery, and the like. Further, the carpet display systems and methods increase aircraft safety by providing well-lit walking surfaces that may also be used for emergency lighting. Further, the carpet display systems and methods may be used to provide information to passengers, such as wayfinding information within an interior cabin of the aircraft. For example, certain embodiments of the present disclosure provide carpet display systems and methods that allow for a continuous display on a carpet, which is especially useful for wayfinding, as individuals are able to follow the display over an entire wayfinding path. The carpet display systems provide relatively lightweight, low cost features aboard an airplane, and increases durability of aircraft touch surfaces.

FIG. 1 illustrates a front perspective view of a vehicle, such as an aircraft 10 (or aircraft assembly), according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an interior cabin, which may include a cockpit, one or more work sections (for example, galleys, personnel carry-on baggage areas, and the like), one or more passenger sections (for example, first class, business class, and coach sections), and an aft section. Each of the sections may be separated by a cabin transition area, which may include one or more class divider assemblies. Overhead stowage bin assemblies may be positioned throughout the interior cabin.

The interior cabin of the aircraft 10 includes a carpet display system, which may be secured to one or more of a floor, walls, ceiling, monuments (such as galleys, transition walls, lavatories, or the like) within the aircraft. The carpet display system is configured to provide light-based effects on carpet layers within the aircraft 10. The light-based or lighting effects may be visual light of any color, graphics, video, and the like transmitted onto the carpet layers.

Alternatively, instead of an aircraft, embodiments of the present disclosure may be used with various other vehicles, such as automobiles, buses, locomotives and train cars, seacraft, spacecraft, and the like.

Figure 2A:
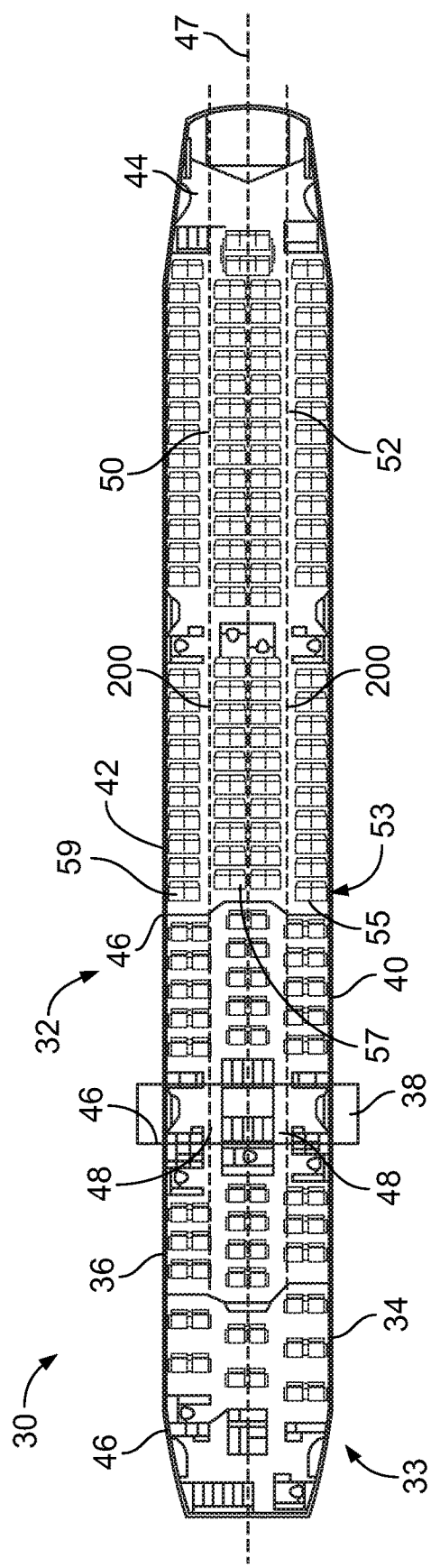
FIG. 2A illustrates a top plan view of an interior cabin of an aircraft, according to an embodiment of the present disclosure.

FIG. 2A illustrates a top plan view of an interior cabin 30 of an aircraft, according to an embodiment of the present disclosure. The interior cabin 30 is within a fuselage 32 of the aircraft 10 (shown in FIG. 1). For example, one or more fuselage wall members may define the interior cabin 30. The interior cabin 30 includes multiple sections or zones, including a front section 33, a first class section 34, a business class section 36, a front galley station 38, a business or an expanded economy or coach section 40, a standard economy or coach section 42, and an aft section 44, which may include multiple lavatories and galley stations. It is to be understood that the interior cabin 30 may include more or less sections and zones than shown. For example, the interior cabin 30 may not include a first class section, and may include more or less galley stations than shown. Each of the sections may be separated by a cabin transition area 46, which may include class divider assemblies between aisles 48.

As shown in FIG. 2A, the interior cabin 30 includes two aisles 50 and 52 that lead to the aft section 44. Optionally, the interior cabin 30 may have less or more aisles than shown. For example, the interior cabin 30 may include a single aisle that extends through the center of the interior cabin 30 that leads to the aft section 44.

As shown, rows 53 of seats are within the interior cabin 30. A row 53 spans across the interior cabin and generally extends across the aisles 50 and 52. Columns 55, 57, and 59 of seat sections are perpendicular to the rows 53. Each seat section may include one or more seats. The columns 55, 57, and 59 generally run parallel with the aisles 50 and 52. A particular section or zone may include any number of columns 55, 57, and 59 of seat sections. As shown in FIG. 2A, at least one zone includes three columns 55, 57, and 59 of seat sections. However, each zone may include more or less than three columns. For example, a first class section or zone may include two columns of seat sections.

The interior cabin 30 includes a carpet display system. The carpet display system includes a plurality of carpet modules. Each carpet module includes a support panel (such as floor panel, wall panel, ceiling panel, monument panel, or the like), a light-emitting element coupled to the panel, and a carpet layer that includes a plurality of carpet fibers or filaments.

The interior cabin may also include one or more electrical signal distribution systems 200 secured to one or more structural components within the interior cabin 30. As shown, each electrical signal distribution system 200 may run parallel with a longitudinal axis 47 of the interior cabin 30. Optionally, the electrical signal distribution systems 200 may not be parallel to the longitudinal axis 47. For example, at least one electrical signal distribution system 200 may span across the interior cabin 30 such that it is perpendicular to the longitudinal axis 47. The interior cabin 30 may include more or less electrical distribution systems 200 than shown. For example, an electrical distribution system 200 may be positioned over each longitudinal section of seats onboard an aircraft.

The electrical signal distribution systems 200 may span from a fore or front section 33 to the aft section 44. The electrical signal distribution systems 200 may span an entire length of the interior cabin 30. Optionally, the electrical signal distribution systems 200 may span less than an entire length of the interior cabin 30.

The electrical signal distribution systems 200 may be secured to various structural components within the interior cabin 30. For example, the electrical signal distribution systems 200 may be securely mounted to strongbacks, passenger service unit (PSU) troughs, stowbins, PSU rails, floor member structure, ceiling structure, wall member structure, and/or the like. The electrical signal distribution systems 200 are configured to provide electrical signals, such as power signals and/or data signals, to various electrical devices within the interior cabin, as described below.

The electrical signal distribution systems 200 are further described in U.S. patent application Ser. No. 15/287,949, entitled "Systems and Methods for Providing Electrical Signals to Electrical Devices Within An Interior Cabin of a Vehicle," filed Oct. 7, 2016, and which is hereby incorporated by reference in its entirety.

Figure 2B:
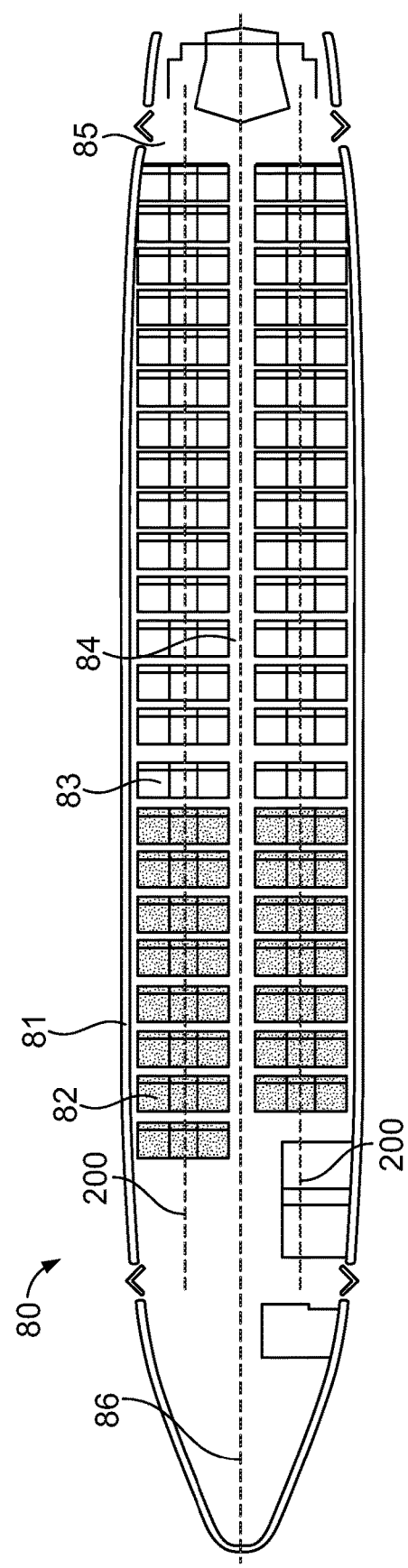
FIG. 2B illustrates a top plan view of an interior cabin of an aircraft, according to an embodiment of the present disclosure.

FIG. 2B illustrates a top plan view of an interior cabin 80 of an aircraft, according to an embodiment of the present disclosure. The interior cabin 80 may be within a fuselage 81 of the aircraft. For example, one or more fuselage wall members may define the interior cabin 80. The interior cabin 80 includes multiple sections or zones, including a main cabin 82 having passenger seats 83, and an aft section 85 behind the main cabin 82. It is to be understood that the interior cabin 80 may include more or less sections or zones than shown.

The interior cabin 80 may include a single aisle 84 that leads to the aft section 85. The single aisle 84 may extend through the center of the interior cabin 80 that leads to the aft section 85. For example, the single aisle 84 may be coaxially aligned with a central longitudinal plane 86 of the interior cabin 80. One or more electrical signal distribution systems 200 are secured to structural components within the interior cabin 80. The interior cabin 80 may include a carpet display system and one or more electrical signal distribution systems.

Figure 3:
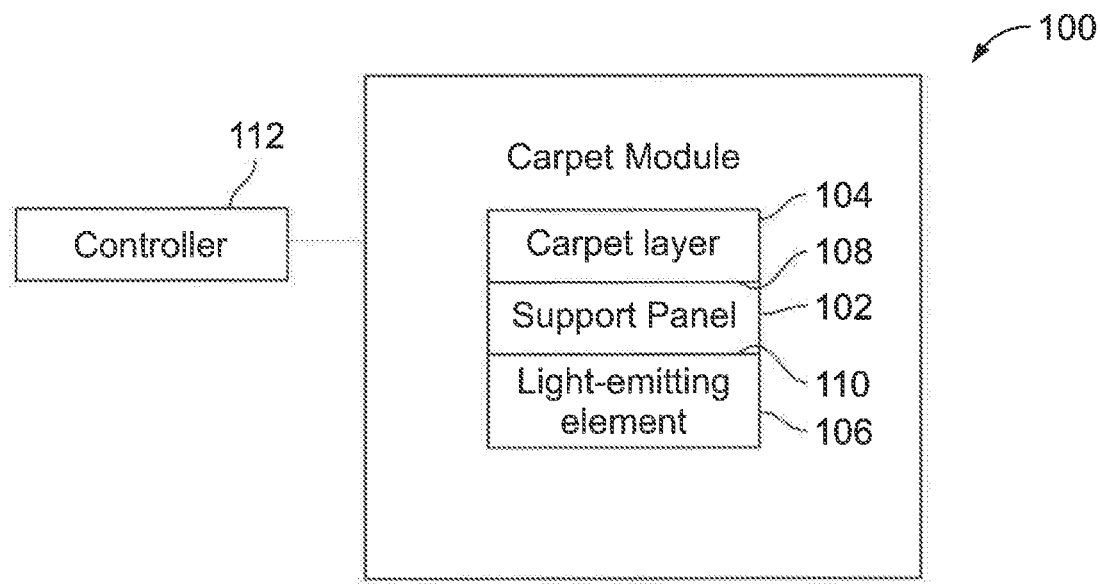
FIG. 3 illustrates a schematic block diagram of a carpet module, according to an embodiment of the present disclosure.

FIG. 3 illustrates a schematic block diagram of a carpet module 100, according to an embodiment of the present disclosure. As described below, a carpet display system includes a plurality of carpet modules 100 within an interior cabin of a vehicle, such as an aircraft.

The carpet module 100 includes a support panel 102 that supports a carpet layer 104. At least one light-emitting element 106 is coupled to the support panel 102 opposite from the carpet layer 104.

The support panel 102 provides a structural support or base for the carpet layer 104. The support panel 102 may be formed of a plastic. The support panel 102 is transparent and translucent, thereby allowing light emitted by the light-emitting element 106 to pass therethrough. The carpet layer 104 includes a plurality of carpet fibers or filaments extending from a user-facing side 108 of the support panel 102.

The light-emitting element 106 includes one or more light-emitting devices, such as one or more LEDs (for example, an array of LEDs), one or more OLEDs, or the like. The light-emitting devices may be arranged to provide a display or monitor. For example, the light-emitting devices may provide a high definition or ultra-high definition display, screen, or monitor. The light-emitting element 106 is securely coupled to an underside 110 of the support panel 102 opposite from the user-facing side 108.

By providing a high definition or ultra-high definition display, screen, or monitor behind the carpet layer 104, the carpet module 100 is able to provide sharper, clearer, and more detailed visual effects (such as a rainbow wash of colors, video, crisp graphics, and the like) that appear continuous, rather than discrete in nature. Even though certain types of carpet layers may, to an extent, provide some distortion, the visual effects are still discernable and continuous.

In at least one embodiment, the carpet layer 104 may be patterned. For example, the carpet layer 104 may include one or more logos or other such graphics. The light-emitting element 106 may be configured to accentuate the pattern of the carpet layer 104, such as a backlighting effect in which flames, rays, or the like appear to be emanating from the logo.

The carpet module 100 may be secured to, or otherwise form, a portion of a floor, wall, ceiling, monument, or the like within an interior cabin of the aircraft 10 (shown in FIG. 1). For example, a plurality of carpet modules 100 may provide a floor section within a zone (such as a first, business or economy class zone) within the interior cabin 30 (shown in FIG. 2A) of the aircraft 10.

A controller 112 is associated with the carpet module 100. In particular, the controller 112 is configured to control operation of the light-emitting element 116 of the carpet module 100. In at least one embodiment, the controller 112 is remote from the carpet module 100, and configured to wirelessly communicate with the light-emitting element 106. In at least one other embodiment, the carpet module 100 includes the controller 112. In at least one embodiment, the controller 112 may be associated with a plurality of carpet modules 100. The controller 112 may be a microcontroller, for example. The controller 112 may be secured to the support panel 102. For example, the controller 112 may be securely coupled to the underside 110 of the support panel 102. Optionally, the controller 112 may be embedded within the support panel 102. In at least one other embodiment, the controller 112 is remotely located from the support panel 102, the carpet layer 104, and the light-emitting element 106. For example, the controller 112 may be secured to various other structures (such as a ceiling, strongback, monument, or the like) within the interior cabin of the aircraft 10.

The controller 112 is in communication with the light-emitting element 106, such as through one or more wired or wireless connections. The controller 112 is configured to control operation of the light-emitting element 106.

In operation, the controller 112 controls the light-emitting element 106 to emit light to provide a desired lighting effect onto the carpet layer 104 of the carpet module 100. The light-emitting element 106 emits the light that passes through the translucent and transparent support panel 102, and onto the carpet layer 104, thereby providing a lighting effect that is viewable by individuals within the interior cabin of the aircraft 10.

Figure 4:
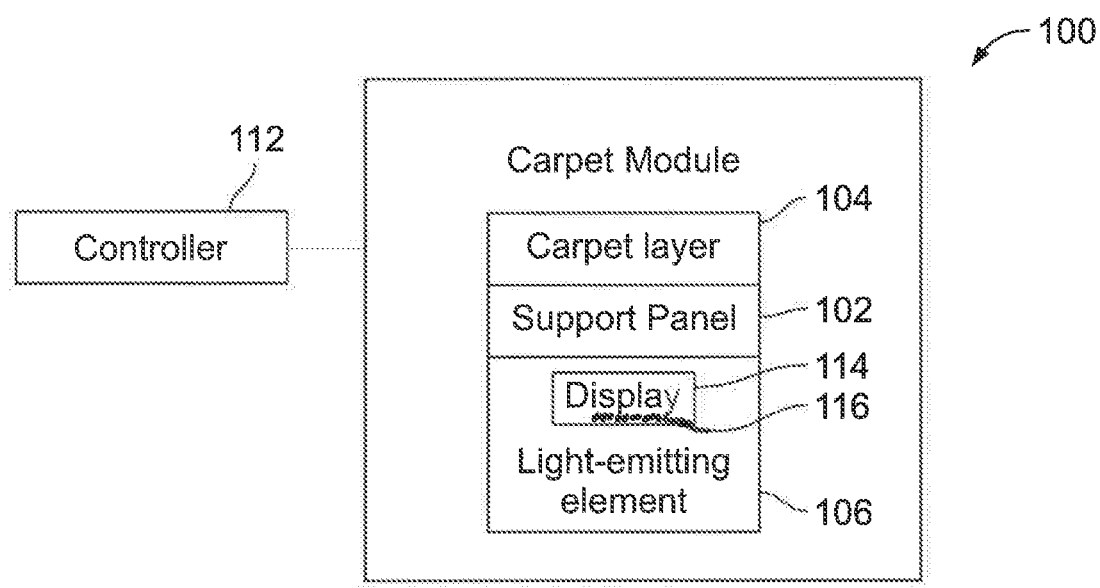
FIG. 4 illustrates a schematic block diagram of a carpet module, according to an embodiment of the present disclosure.

FIG. 4 illustrates a schematic block diagram of a carpet module 100, according to an embodiment of the present disclosure. The carpet module 100 is similar to the carpet module 100 shown in FIG. 3, except that the light-emitting element 106 may include a separate display screen 114 that includes one or more light-emitting devices 116, which may be or include at least one high resolution OLED display.

Figure 5:
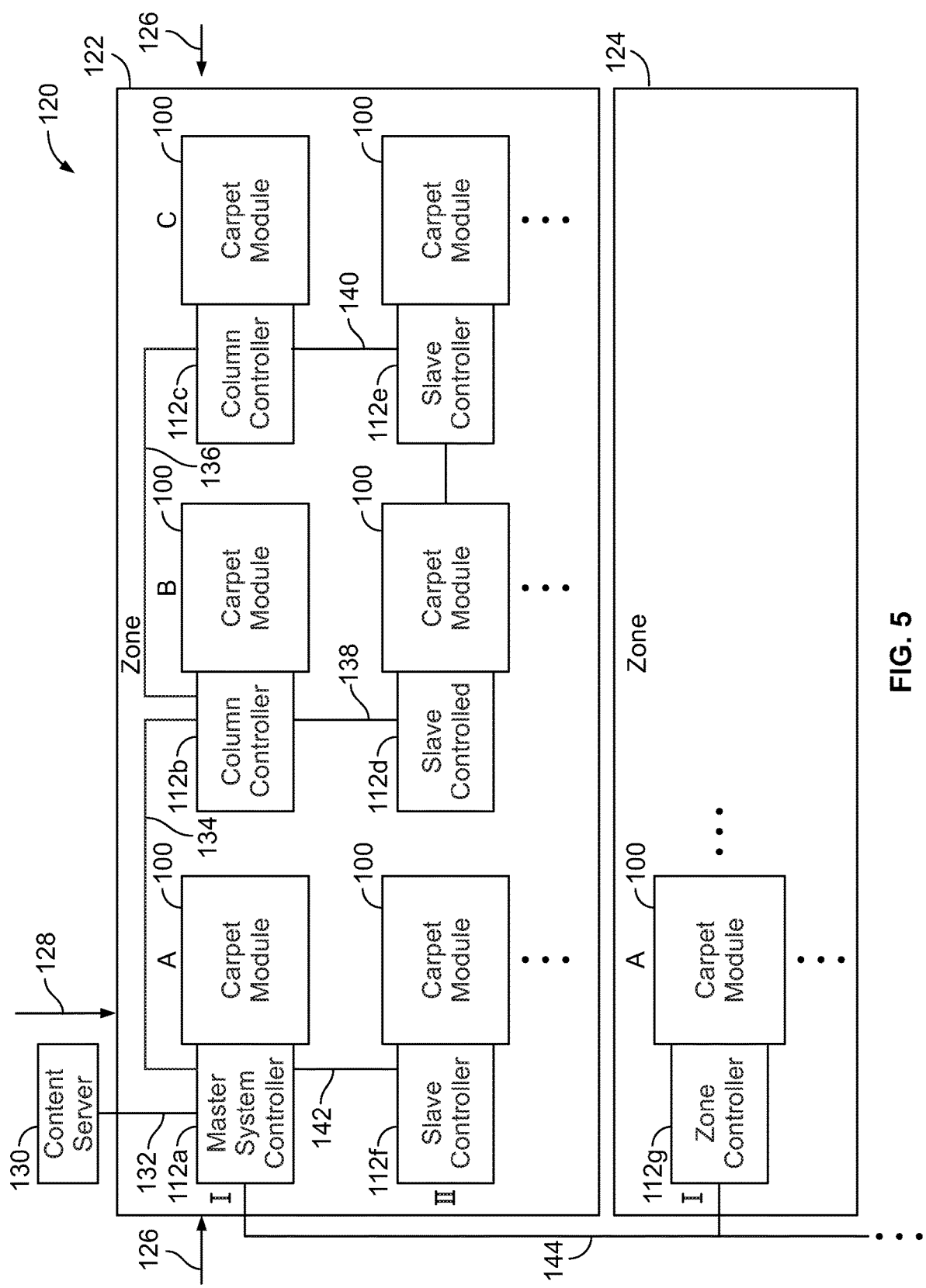
FIG. 5 illustrates a schematic block diagram of a carpet display system, according to an embodiment of the present disclosure.

FIG. 5 illustrates a schematic block diagram of a carpet display system 120, according to an embodiment of the present disclosure. The carpet display system 120 includes a plurality of zones, such as zones 122 and 124. The carpet display system 120 may include more zones than shown, or just a single zone, such as the zone 122. Each zone 122 and 124 may be associated or otherwise form part of a particular section onboard the aircraft 10 (shown in FIG. 1). For example, the zone 122 may be associated with a first class section within an interior cabin, while the zone 124 may be associated with an economy class section. Optionally, the zones 122 and 124 may form portions of particular sections within the aircraft 10. For example, the zone 122 may be associated with a first group of seats within a particular section (such as an economy class section), while the zone 124 may be associated with a second group of seats within the same section.

Each zone 122 and 124 includes a plurality of carpet modules 100. The carpet modules 100 may form floor segments or portions within the zones 122 and 124. Optionally, the carpet modules 100 may form wall or ceiling segments or portions within the zones 122 and 124. As another example, the carpet modules 100 may form monument segments or portions within the zones 122 and 124. In at least one embodiment, the carpet modules 100 form at least two of floor, wall, ceiling, and monument sections within the zones 122 and 124.

A row 126 of carpet modules 100 may be associated with a row of seats within the aircraft 10, such as the row 53 shown in FIG. 2A. A column 128 of carpet modules 100 may be associated with a column of seats within the aircraft 10, such as any of the columns 55, 57, and 59 shown in FIG. 2A.

The carpet display system 120 may include a content server 130 that provides content to all of the controllers 112 of the carpet modules 100. In particular, the content server 130 is communicatively coupled to a master system controller 112a associated with the carpet module 100 in row I, column A of the zone 122. As such, the carpet module 100 in row I, column A of zone 122 is the master system carpet module. The content server 130 is in communication with the master system controller 112a through a main network connection 132, such as a wired or wireless connection. The master system controller 112a is configured to control operation of all of the controllers 112 of the carpet modules 100 within the zones 122 and 124. In at least one embodiment, the content server 130 is configured to provide video, text, graphics, and the like for all of the carpet modules 100. The master system controller 112a distributes operational control of the carpet display system 120 among all of the controllers 112 within the carpet display system 120.

The master system controller 112a is communicatively coupled to a column controller 112b of the carpet module 100 within row I, column B of the zone 122 through a wired or wireless row network connection 134. The master system controller 112a is also communicatively coupled to a column controller 112c of the carpet module 100 within row I, column C of the zone 122 through a wired or wireless row network connection 136, which may be in series or parallel with the row network connection 134. The carpet modules 100 within row I, column B associated with the column controllers 112b and 112c are column-controlling carpet modules. The master system controller 122a controls operation of each of the column controllers 112b and 112c, which, in turn, control operation of slave controllers 112d and 112e associated with carpet modules 100 (for example, slave carpet modules) coupled to the column controllers 112b and 112c through respective wired or wireless column network connections 138 and 140, respectively. The master system controller 112a of the carpet module 100 in row I, column A also controls the slave controller 112f of the carpet module 100 (for example, another slave carpet module) in row II, column A within the zone 122 through a wired or wireless column network connection 142.

As such, the master system controller 112a controls operation of the each of the column controllers 112b and 112c within the row I, and the slave controller(s) 112f within column A. The column controllers 112b and 112c, in turn, control operation (as distributed and dictated by the master system controller 112a) of the respective slave controllers 112d and 112e within their respective columns B and C.

In addition to providing a zone controller for all of the controllers 112 within the zone 122, the master system controller 112a also controls operation of the controllers 112 within the zone 124. The master system controller 112a is communicatively coupled to a zone controller 112g of the carpet module 100 (for example, a zone-controlling carpet module) in row I, column A of zone 124 via a wired or wireless zone network connection 144. The master system controller 112a may also be in communication with other zone controllers of other zones via the zone network connection 144 or another zone network connection.

The zone controller 112g is configured to control operation of all of the controllers of the carpet modules 100 within the zone 124, similar to how the master system controller 112a controls the various controllers 112 within the rows and columns of the zone 122. However, operation of the zone controller 112g is controlled and dictated by the master system controller 112a.

The various network connections (for example, the network connections 132, 134, 136, 138, 140, 142, and 144) of the carpet display system 120 may be Ethernet connections, RS485 connections, LVDS connections, and/or the like. In at least one other embodiment, the network connections may include daisy chain connections therebetween.

As described above, the carpet display system 120 provides a distributed control network in that the master system controller 112a controls and distributes operational control of zone controllers, such as the zone controllers 112 (with the master system controller 112a providing a zone controller for the zone 120), which, in turn control operation of column controllers, such as the column controllers 112b and 112c, which, in turn control operation of slave controllers, such as the slave controllers 112d and 112e within respective columns of a particular zone. In this manner, operative control is distributed and divided among the various carpet modules 100. The various controllers 112 need not be required to control all operations of a particular carpet module 100, as such control is hierarchically distributed among the master system controller 112a, the zone controller 112g, the column controllers 112b, 112c, and the slave controllers 112d, 112e, and 112f (for example. Therefore, overall computing energy is conserved, and smaller, lighter, and less costly controllers 112 may be used, thereby allowing the carpet display system 120 to be efficiently and effectively used onboard on aircraft.

At least one of the carpet modules 100 may include at least one display, such as a high resolution display. At least one of the carpet modules may include multiple displays.

In at least one embodiment, each of the carpet modules 100 may be coupled to a power display, such as through a plug and outlet connection. For example, each carpet module 100 may include a plug that couples to a power outlet within the interior cabin. In at least one embodiment, one carpet module 100 may be directly coupled to a power outlet, while the other carpet modules 100 are coupled to that carpet module 100 (such as through a daisy chain) to receive power. In at least one other embodiment, the carpet modules 100 may be coupled to an electrical signal distribution system 200, such as that shown and described with respect to FIG. 2A. In at least one other embodiment, the various network connections are configured to provide data and power signals to each of the controllers 112.

As used herein, the term "controller," "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the controllers 112 may be or include one or more processors that are configured to control operations, as described above. As indicated, each controller 112 may be a microcontroller.

Each of the controllers 112 is configured to execute a set of instructions that are stored in one or more data storage units or elements (such as one or more memories), in order to process data. For example, each of the controllers 112 may include or be coupled to one or more memories. The data storage units may also store data or other information as desired or needed. The data storage units may be in the form of an information source or a physical memory element within a processing machine.

The set of instructions may include various commands that instruct each of the controllers 112 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the controllers 112. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, each of the controllers 112 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 6:
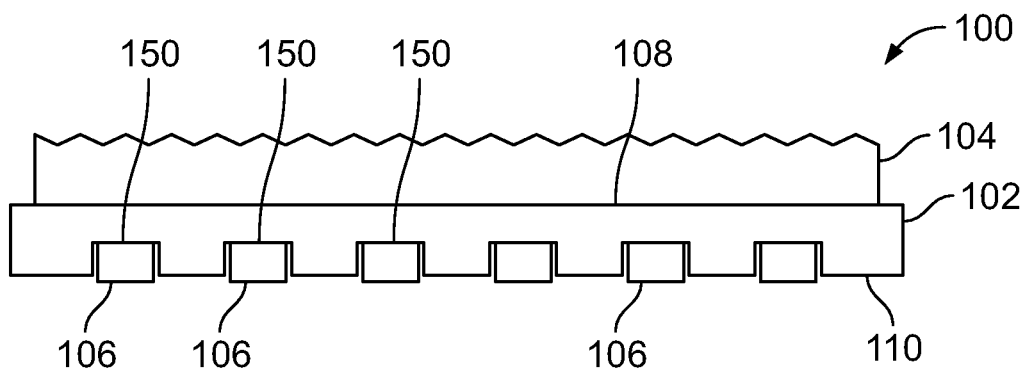
FIG. 6 illustrates a lateral view of a carpet module, according to an embodiment of the present disclosure.

FIG. 6 illustrates a lateral view of a carpet module 100, according to an embodiment of the present disclosure. In this embodiment, the support panel 102 includes a plurality of channels 150 formed in the underside 110. The channels 150 provide recessed areas formed into the support panel 102 from the underside 110. The light emitting elements 106 are secured within the channels 150. The support panel 102 may include more or less channels 150 and light emitting elements 106 than shown.

Because the light-emitting elements 106 are secured within the channels 150 (as opposed to simply being secured to a flat, planar underside of the support panel), there is less material for light generated by the light-emitting elements 106 to pass through before passing through the user-facing side 108 of the support panel 102. As such, less light energy is attenuated by the support panel 102, thereby reducing the amount of energy needed to operate the light-emitting elements 106, and also reducing generated heat. In this manner, the light-emitting elements 106 may be driven using less power than if the light-emitting elements 106 were simply secured to a flat, planar underside of a support panel. Further, thickened portions of the support panel 102 between the channels 150 may provide structural elements that minimize structural loading on the light-emitting elements 106.

Figure 7:
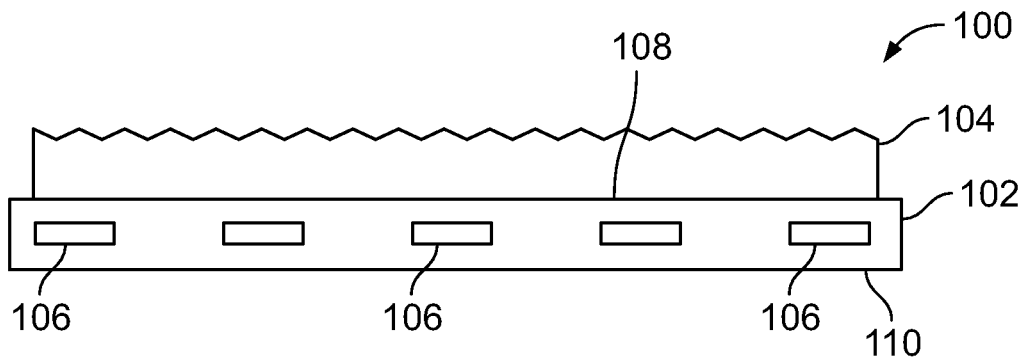
FIG. 7 illustrates a lateral view of a carpet module, according to an embodiment of the present disclosure.

FIG. 7 illustrates a lateral view of a carpet module 100, according to an embodiment of the present disclosure. In this embodiment, the light-emitting elements 106 are embedded within the support panel 102. The carpet module 100 may include more or less light-emitting elements 106 than shown.

Because the light-emitting elements 106 are embedded within the support panel 102, there is less material for generated light to pass through than if the light-emitting elements 106 were secured to a flat underside of the support panel 102. Therefore, the light-emitting elements 106 may be driven using less power.

Figure 8:
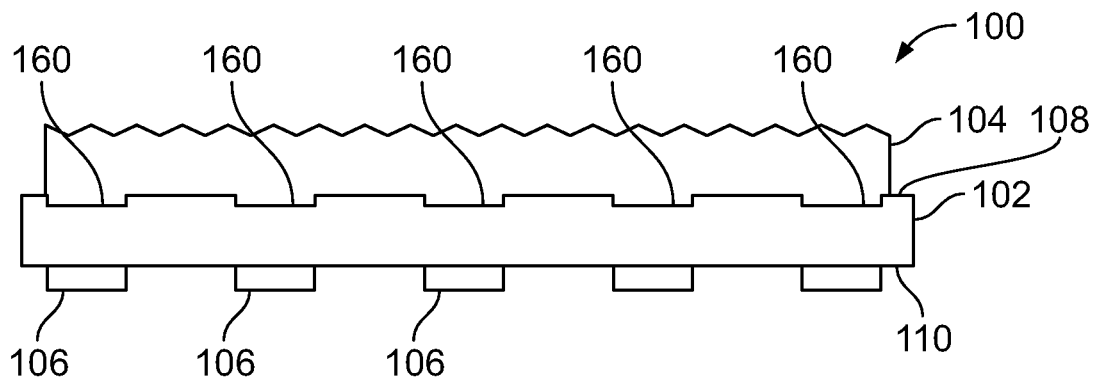
FIG. 8 illustrates a lateral view of a carpet module, according to an embodiment of the present disclosure.

FIG. 8 illustrates a lateral view of a carpet module 100, according to an embodiment of the present disclosure. In this embodiment, the light-emitting elements 106 are secured to a flat underside of the support panel 102. However, recessed channels 160 are formed in the user-facing side 108 of the support panel 102. The channels 160 are aligned with (such as directly over) the light-emitting elements 106. The light-emitting elements 106 emit light energy through the channels 160. As such, less light energy is attenuated as compared to a flat, planar support panel. The carpet module 100 may include more or less channels 160 and light-emitting elements 106 than shown.

In at least one embodiment, the carpet module 100 may also include channels 150 (shown in FIG. 6) in addition to the channels 160. The channels 150 and 160 may be vertically (as shown in the orientation of FIG. 8) aligned.

The light-emitting elements 106 may be secured within the channels 160 formed in the underside 110 of the support panel 102.

Referring to FIGS. 6-8, light pipes may be positioned above and/or coupled to the light-emitting elements 106 and extend through the support panel 102. The light pipes allow light to pass through the support panel 102 with little to no attenuation. As such, the light-emitting elements 106 may be operated using less power.

Figure 9:
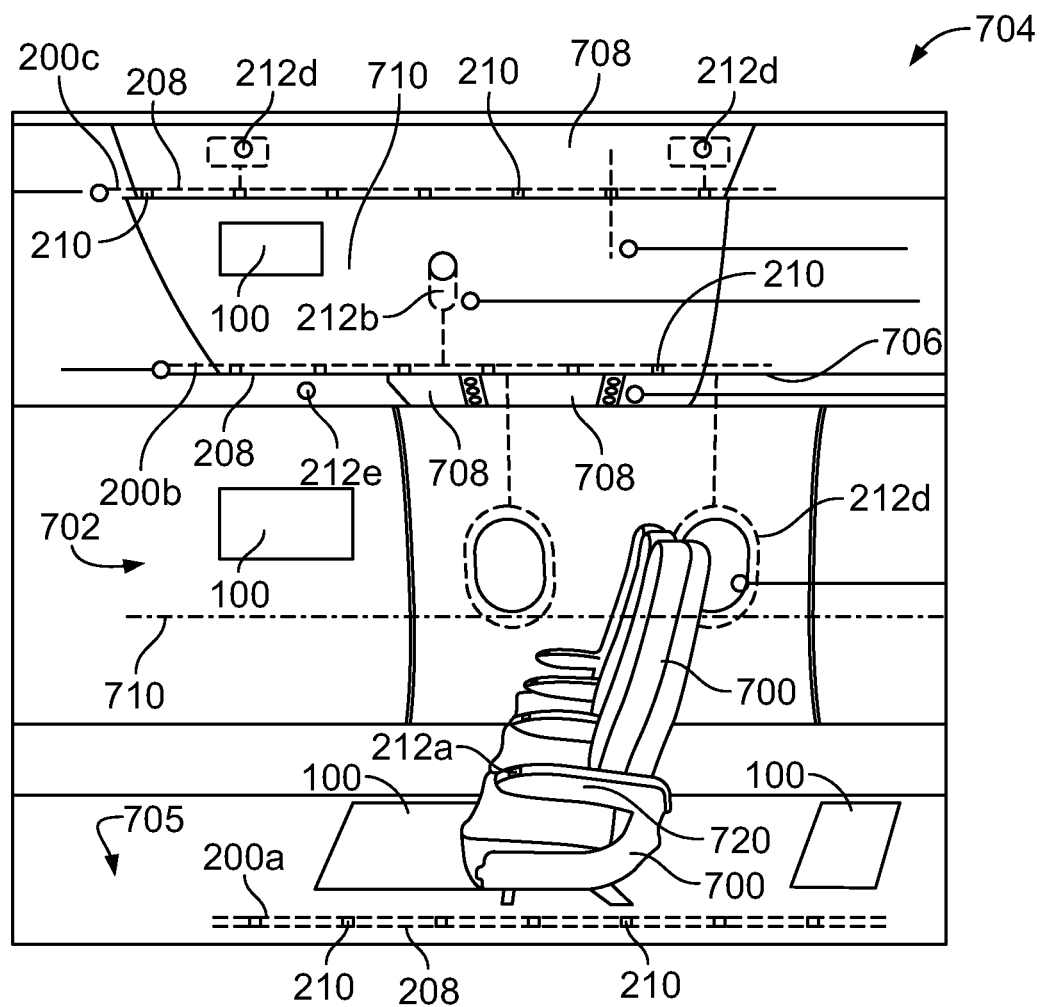
FIG. 9 illustrates a lateral perspective view of a row of seats within an interior cabin of a vehicle, according to an embodiment of the present disclosure.

FIG. 9 illustrates a lateral perspective view of a row of seats 700 within an interior cabin 702 of a vehicle 704, according to an embodiment of the present disclosure. The interior cabin 702 may include a first electrical signal distribution system 200a mounted to a floor member 705 of the interior cabin, a second electrical signal distribution system 200b mounted to a passenger service unit (PSU) rail 706 that supports PSUs 708 below stowage bin assemblies 710, and a third electrical signal distribution system 200c mounted to a ceiling 708 of the interior cabin 702. Optionally, the interior cabin 702 may include less than all of the electrical signal distribution systems 200a, 200b, and 200c.

As shown, the electrical signal distribution systems 200a, 200b, and 200c extend along a length of the interior cabin 702. The electrical signal distribution systems 200a, 200b, and 200c are parallel with a central longitudinal axis 710 of the interior cabin 702, or at least a portion thereof. Optionally one or more electrical signal distribution systems may be laterally oriented with respect to the interior cabin 702, such that they are perpendicular to the central longitudinal axis 710.

Various electrical devices may be coupled to outlets 210 of the electrical signal distribution systems 200a, 200b, and 200c. For example, consoles 212a on armrests 720 of the seats 700 may be electrically coupled to the electrical signal distribution system 200a. The consoles 212a may be or include a display, such as a monitor, touchscreen, and/or the like. Optionally, the consoles 212a may be mounted to rear surfaces of seats. The PSUs 708 and stowbin latches 212b may be electrically coupled to the electrical signal distribution system 200b. Accent lighting assemblies 212 and speakers may be electrically coupled to the electrical signal distribution system 200c. Further, lighting assemblies 212d may be electrically coupled to the electrical distribution system 200b.

Also, microphones 212e may be electrically coupled to the electrical distribution system 200b. The microphones 212e may be located throughout the interior cabin 702, and allow a flight attendant to broadcast messages during a flight.

Further, carpet modules 100 may be coupled to outlets 210 of the electrical signal distribution systems 200a, 200b, and 200c. For example, controllers 112 (shown in FIGS. 3-5) associated with the carpet modules 100 may receive data and power signals through the electrical signal distribution systems 200a, 200b, and 200c.

The electrical signal distributions systems 200a-c replace wiring and bundles traditionally used to connect electrical devices to power and data sources. Regularly-spaced outlets 210 on the PCBs 208 allow for quick and easy connection to various electrical devices throughout the interior cabin 702.

Figure 10:
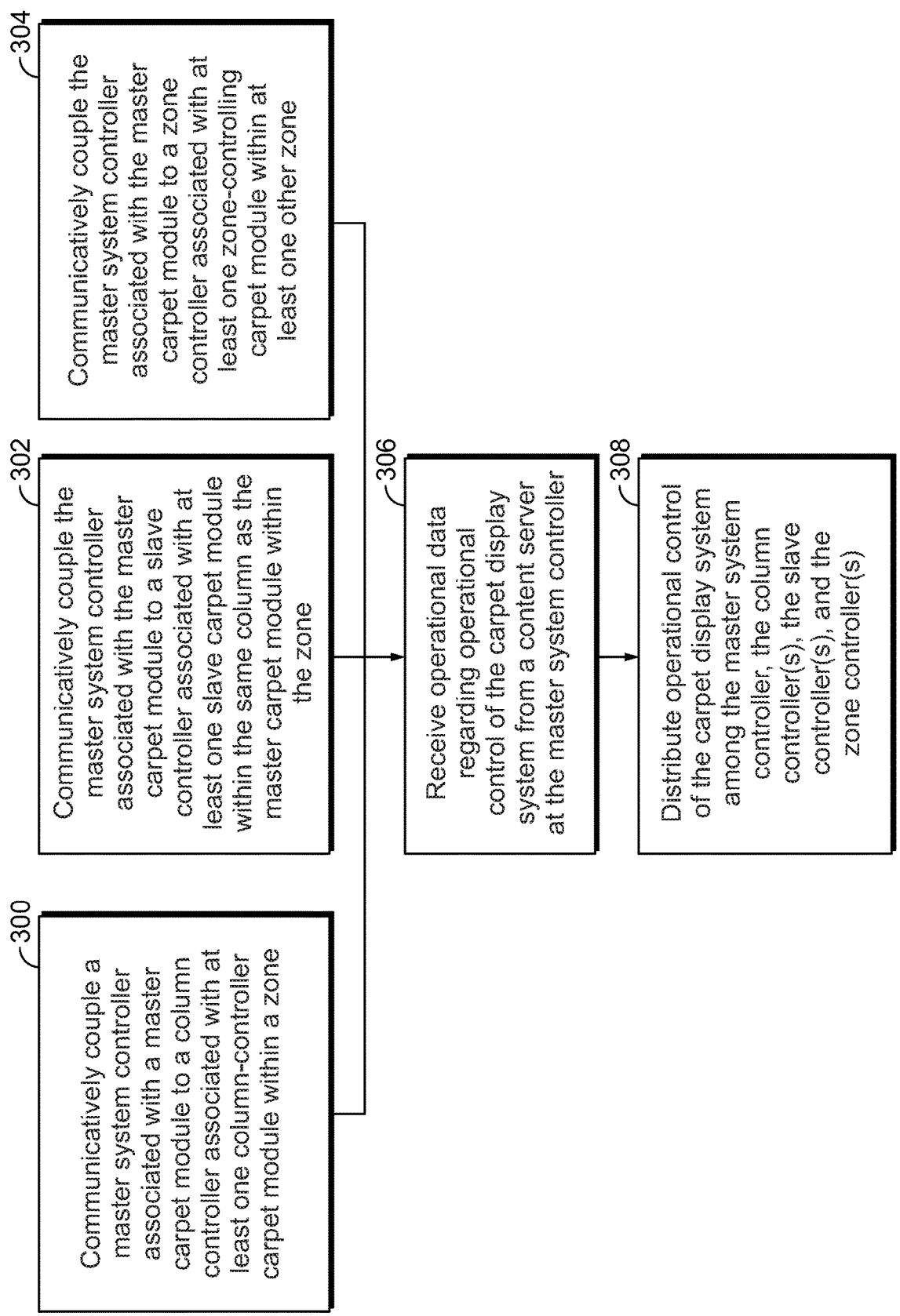
FIG. 10 illustrates a flow chart of a method of operating a carpet display system within an interior cabin of an aircraft, according to an embodiment of the present disclosure.

FIG. 10 illustrates a flow chart of a method of operating a carpet display system 120 within an interior cabin of an aircraft, according to an embodiment of the present disclosure. Referring to FIGS. 5 and 10, at 300, a master system controller (such as the master system controller 112a) associated with a master carpet module is communicatively coupled to a column controller (such as the column controllers 112a and 112b) of at least one column-controlling carpet module 112 (such as those associated with the column controllers 112a and 112b) within a zone, such as the zone 122.

At 302, the master system controller is also communicatively coupled to a slave controller (such as the slave controller 112f) associated with at least one slave carpet module (such as the carpet module 100 associated with the slave controller 112t) within the same column (such as the column 128) as the master carpet module within the zone, such as the zone 122. At 304, the master system controller is also communicatively coupled to a zone controller (such as the zone controller 112g) associated with at least one zone-controlling carpet module (such as the carpet module 100 associated with the zone controller 112g) within at least one other zone, such as the zone 124. The zone controller 112g is communicatively coupled to one or more column controllers, slave controllers, or the like that are associated with column-controlling carpet modules and/or slave carpet modules within the other zone(s). 300, 302, and 304 may occur at the same time. Optionally, 300 may occur before either or both of 302 and 304; 302 may occur before either or both 300 and 304, or 304 may occur before either or both of 300 and 302.

At 306, the master system controller receives operational data regarding operational control of the carpet display system, such as from a content server (for example, the content server 130). At 308, operational control of the carpet display system 100 is distributed among the master system controller, the column controller(s), the salve controller(s), and the zone controller(s).

As described above, embodiments of the present disclosure provide systems and methods for selectively adapting a carpet aesthetic within an aircraft without the need for replacing an existing carpet therein. The systems and methods efficiently and effectively incorporate light-transmissive carpet within an interior cabin of a vehicle, such as an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft comprising:
   an interior cabin; and
   a carpet display system within the interior cabin, the carpet display comprising a plurality of carpet modules, wherein each of the plurality of carpet modules includes:
      a translucent support panel;
      a carpet layer secured to the support panel; and
      one or more display screens coupled to the support panel, wherein the one or more display screens are configured to emit light through the support panel to provide lighting effects through the carpet layer.

2. The aircraft of claim 1, wherein each of the plurality of carpet modules further comprises an associated controller that is configured to control operation of the one or more display screens.

3. The aircraft of claim 1, wherein the plurality of carpet modules comprises:
   a master system carpet module having an associated master system controller within a first zone of an interior cabin of a vehicle;
   at least one column-controlling carpet module having an associated column controller within the first zone, wherein the column controller is communicatively coupled to the master system controller; and
   at least one slave carpet module having an associated slave controller within the first zone, wherein the slave controller is communicatively coupled to the column controller,
   wherein the master system controller distributes operational control of the carpet display system among the master system controller, the column controller, and the slave controller.

4. The aircraft of claim 3, wherein the plurality of carpet modules further comprises at least one other slave carpet module having an associated other slave controller within the first zone, wherein the associated other slave controller is communicatively coupled to the master system controller, wherein the master system controller further distributes operational control of the carpet display system to the associated other slave controller.

5. The aircraft of claim 3, wherein the plurality of carpet modules further comprises a zone-controlling carpet module having an associated zone controller within a second zone of the interior cabin that differs from the first zone, wherein the zone controller is communicatively coupled to the master system controller, wherein the master system controller further distributes operational control of the carpet display system to the zone controller.

6. The aircraft of claim 5, wherein the zone controller is communicatively coupled to another column controller associated with at least one other column-controlling carpet module within the second zone.

7. The aircraft of claim 6, wherein the another column controller is communicatively coupled to another slave controller associated with at least one other slave carpet module within the second zone.

8. The aircraft of claim 1, wherein the plurality of carpet modules are secured to one or more of a floor, wall, ceiling, or monument within the interior cabin.

9. The aircraft of claim 1, wherein the one or more display screens comprises one or more light emitting diodes (LEDs), or one or more organic light emitting diodes (OLEDs).

10. The aircraft of claim 1, wherein the support panel comprises at least one channel formed through a surface.

11. The aircraft of claim 10, wherein at least a portion of the one or more display screens is secured to the support panel within the at least one channel.

12. The aircraft of claim 10, wherein at least a portion of the one or more display screens is configured to emit light through the at least one channel.

13. The aircraft of claim 10, wherein the one or more display screens is embedded within the support panel.

14. The aircraft of claim 1, wherein the carpet display system further comprises at least one electrical distribution system within the interior cabin, wherein the one or more display screens receives one or both of power and data signals through the at least one electrical distribution system.

15. A method of providing lighting effects through a carpet display system within an interior cabin of an aircraft, the method comprising:
  providing a plurality of carpet modules within the interior cabin of the aircraft; and
  emitting light energy from display screens of the plurality of carpet modules through support panels to provide lighting effects through carpet layers.

16. The method of claim 15, further comprising associating a controller that is configured to control operation of the one or more display with each of the plurality of carpet modules.

17. The method of claim 15, wherein the providing comprises:
  providing a master system carpet module having an associated master system controller within a first zone of the interior cabin;
  providing at least one column-controlling carpet module having an associated column controller within the first zone;
  communicatively coupling the column controller to the master system controller;
  providing at least one slave carpet module having an associated slave controller within the first zone;
  communicatively coupling the slave controller to the column controller;
  providing at least one other slave carpet module having an associated other slave controller within the first zone;
  communicatively coupling the associated other slave controller to the master system controller, wherein the master system controller further distributes operational control of the carpet display system to the associated other slave controller;
  providing a zone-controlling carpet module having an associated zone controller within a second zone of the interior cabin that differs from the first zone;
  communicatively coupling the zone controller to the master system controller; and
  distributing operational control of the carpet display system among the master system controller, the column controller, the slave controller, the other slave controller, and the zone controller.

18. The method of claim 17, further comprising:
  communicatively coupling the zone controller to another column controller associated with at least one other column-controlling carpet module within the second zone;
  communicatively coupling the another column controller to another slave controller associated with at least one other slave carpet module within the second zone.

19. An aircraft comprising:
  an interior cabin; and
  a carpet display system within the interior cabin, wherein the carpet display system comprises a plurality of carpet modules within the interior cabin, wherein the plurality of carpet modules are secured to one or more of a floor, wall, ceiling, or monument within the interior cabin, wherein each of the plurality of carpet modules includes:
    a translucent support panel;
    a carpet layer secured to the support panel; and
    one more display screens coupled to the support panel, wherein the one or more display screens are configured to emit light through the support panel to provide lighting effects through the carpet layer,
  wherein the plurality of carpet modules comprises:
    a master system carpet module having an associated master system controller within a first zone of the interior cabin;
    at least one column-controlling carpet module having an associated column controller within the first zone, wherein the column controller is communicatively coupled to the master system controller;
    at least one slave carpet module having an associated slave controller within the first zone, wherein the slave controller is communicatively coupled to the column controller;
    at least one other slave carpet module having an associated other slave controller within the first zone, wherein the associated other slave controller is communicatively coupled to the master system controller, wherein the master system controller further distributes operational control of the carpet display system to the associated other slave controller; and
    a zone-controlling carpet module having an associated zone controller within a second zone of the interior cabin that differs from the first zone, wherein the zone controller is communicatively coupled to the master system controller, wherein the master system controller further distributes operational control of the carpet display system to the zone controller, wherein the master system controller distributes operational control of the carpet display system among the master system controller, the column controller, the slave controller, the associated other slave controller, and the zone controller.

20. The aircraft of claim 1, wherein the one or more display screens are ultra-high definition display screens.

* * * * *